United States Patent [19]
Beale et al.

[11] Patent Number: 6,006,876
[45] Date of Patent: Dec. 28, 1999

[54] DUPLEX ELECTRICAL COLLECTOR SHOE

[75] Inventors: Robert S. Beale, Stratford; William R. Heil, Shelton, both of Conn.

[73] Assignee: Howell Corporation, Stratford, Conn.

[21] Appl. No.: 08/946,933

[22] Filed: Oct. 8, 1997

[51] Int. Cl.$^6$ .................................................. B60L 5/00
[52] U.S. Cl. ..................... 191/59.1; 191/60.3; 191/47; 191/57
[58] Field of Search .................................. 191/45 R, 47, 191/50, 57, 58, 59, 59.1, 60, 60.1, 60.2, 60.3

[56] References Cited

U.S. PATENT DOCUMENTS

| | | | |
|---|---|---|---|
| 2,537,866 | 1/1951 | Tanner | 191/57 |
| 3,123,191 | 3/1964 | Sprigings | 191/58 |
| 5,351,794 | 10/1994 | Deutzer | 191/59.1 |
| 5,676,224 | 10/1997 | Clarke et al. | 191/59.1 |

*Primary Examiner*—Mark T. Le
*Attorney, Agent, or Firm*—H. Gibner Lehmann; K. Gibner Lehmann

[57] ABSTRACT

A duplex electrical collector for a rail electrification system comprises a pair of slim elongate back-to-back metal conductor shoes which are supported respectively intermediate their ends by short sturdy offset metal plates that project laterally of the shoes. The metal plates can be cast integral with the shoes, or else attached to the shoes by ribs that are crimped into grooves of the shoes. The metal plates have bores to accommodate a pivot pin that carries a torsion spring, thereby to impart a bias that tends to spread apart the shoes. The ends of a copper lead wire are secured to the plates, and a terminal strip is carried at the center of the lead wire. This assemblage is encased in an insulating two-part housing that mounts it, and is held captive by interlocking shoulders on the plates and housing parts. The center portion of the lead wire and the terminal attached thereto are brought out through a collar of the housing.

28 Claims, 7 Drawing Sheets

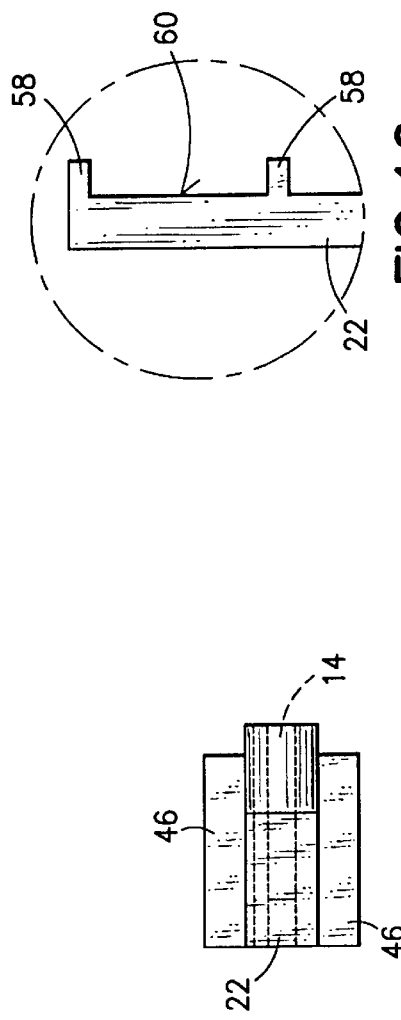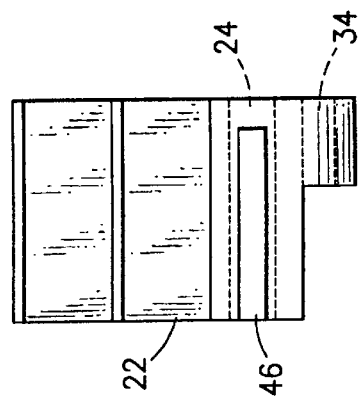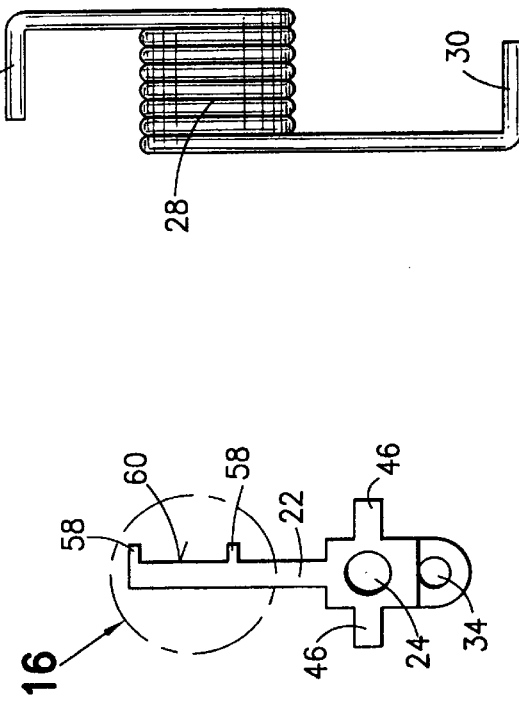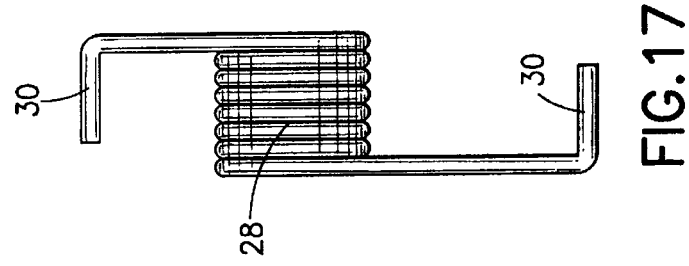

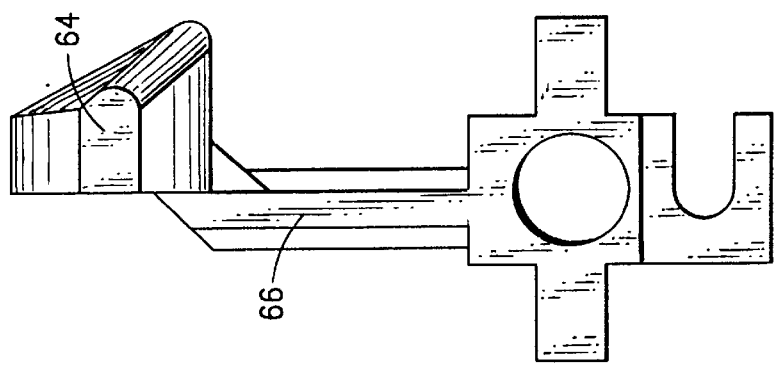
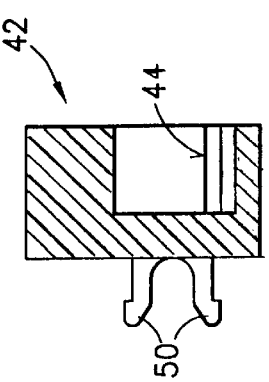
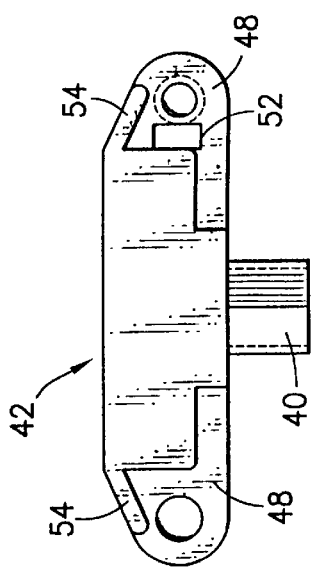
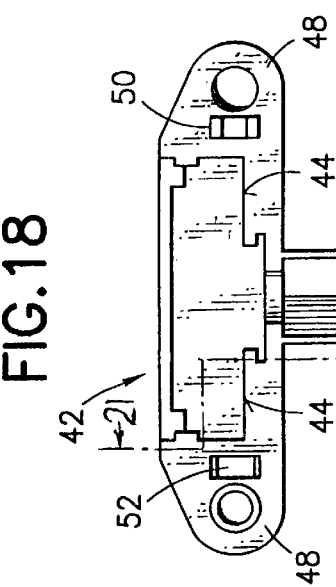
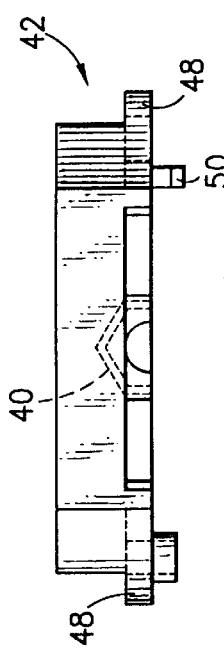

DUPLEX ELECTRICAL COLLECTOR SHOE

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT.

Research and development of the present invention and application have not been Federally-sponsored, and no rights are given under any Federal program.

BACKGROUND OF THE INVENTION

Field of the Invention

This invention relates to electrical collector shoes for rail electrification systems, and more particularly to the means for the mounting of such shoes, and to the conductivity and insulation of the same.

Various type of electrical collector shoes have been proposed and produced in the past. Some have been miniaturized to reduce size and weight, others have been made more sturdy and larger to increase their capacity, and in between these constructions, alterations and modifications have been effected to obtain specific improvements, including longer useful operating life and cost reduction. Each in some measure enjoyed certain benefits resulting from the changes that were made.

SUMMARY OF THE INVENTION

The present invention is directed to improvements in duplex electrical collector shoes which result in a number of advantages, and one object of the invention is to provide an improved electrical collector shoe which is especially simple in its construction, and low in cost.

Another object of the invention is to provide an improved collector shoe as above set forth, which will carry and transmit relatively large electrical loads and still have a long and useful operating life.

A further object of the invention is to provide an improved collector shoe in accordance with the foregoing, which is of relatively small size, and is light in weight.

An additional object of the invention is to provide an improved collector shoe as above characterized, which is rugged and durable both physically and electrically, and capable of withstanding appreciable wear before requiring servicing.

A feature of the invention is the provision of an improved electrical collector shoe which provides for excellent ventilation with high amperage capacity for its weight.

Another feature of the invention resides in a construction wherein correct alignment is maintained between the shoes and the track.

Yet another object of the invention is to provide an improved collector shoe assemblage which has compact dimensions, thereby to effect efficient use of minimal space.

An additional feature of the invention is the use of a modular design which facilitates the use of multiple conductors easily mounted in various combinations with multiple collector assemblies.

Another feature is the provision of skin-tight insulation which runs cooler and will not deform under clamping pressures, and which provides for hand-safe design.

Other features and advantages will hereinafter appear.

BRIEF DESCRIPTION OF THE DRAWINGS

FIG. 13 is a side elevational view of one of the end plates which supports its associated shoe.

FIG. 14 is a top plan view of the end plate of FIG. 13.

FIG. 15 is an end elevational view of the plate.

FIG. 16 is a fragmentary detail, enlarged, of the upper portion of the plate.

FIG. 17 is a side elevational view of the biasing spring of the duplex collector.

FIG. 18 is an outside elevational view of one half of the insulating housing of the collector, the other half of the housing being a mirror image of said one half.

FIG. 19 is an inside elevational view of the housing half of FIG. 18.

FIG. 20 is a top plan view of the housing half shown in FIG. 19.

FIG. 21 is a sectional view of the housing of FIG. 19, taken on line 21—21 of FIG. 19.

FIG. 22 is a side edge elevational view of a one-piece shoe and mounting plate as it might be cast in beryllium copper, constituting another embodiment of the invention.

DESCRIPTION OF A PREFERRED EMBODIMENT

Figure 3:
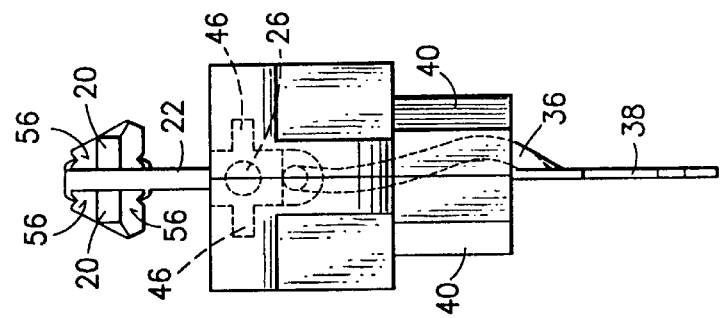
FIG. 3 is an end elevational view of the collector.
Figure 1:
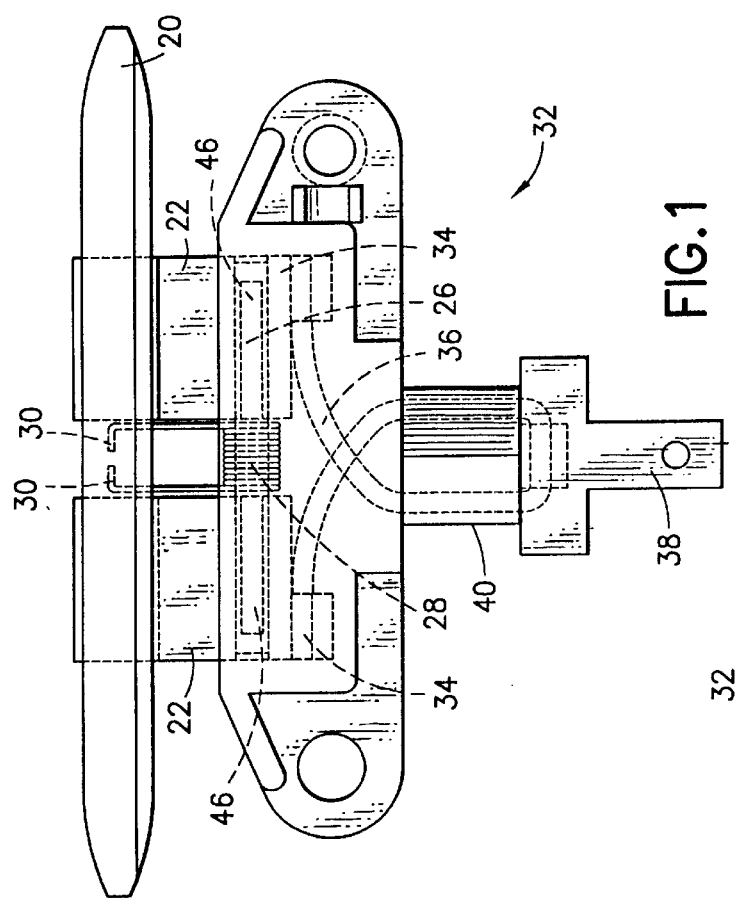
FIG. 1 is a side elevational view of the improved duplex electrical collector, illustrating one embodiment of the invention.
Figure 2:
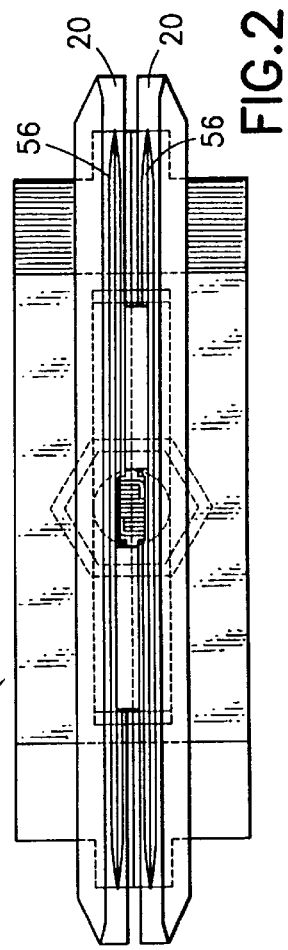
FIG. 2 is a top plan view of the electrical collector of FIG. 1.
Figure 6:
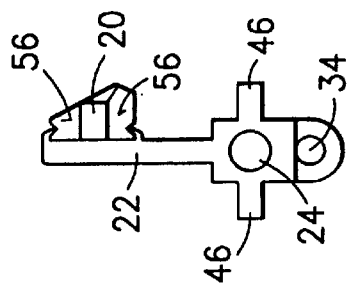
FIG. 6 is an end elevational view of the assemblage of FIG. 4.
Figure 4:
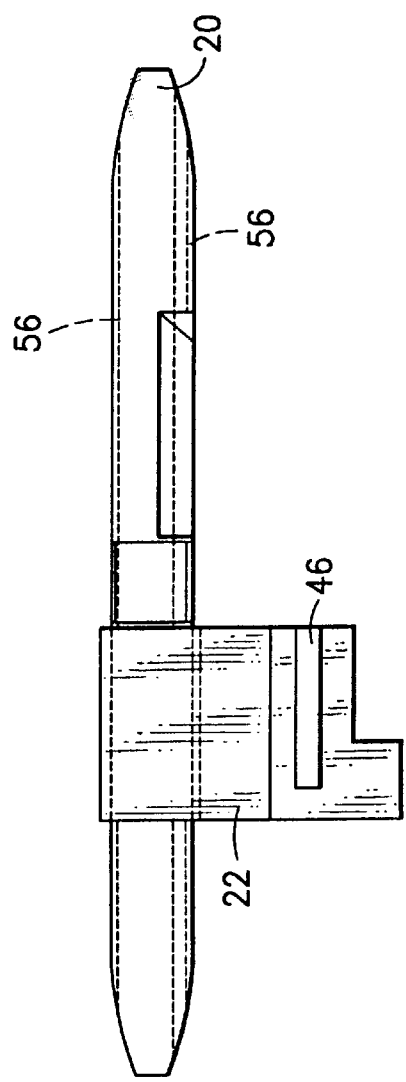
FIG. 4 is a side elevational view of one collector shoe and support plate assemblage.
Figure 5:
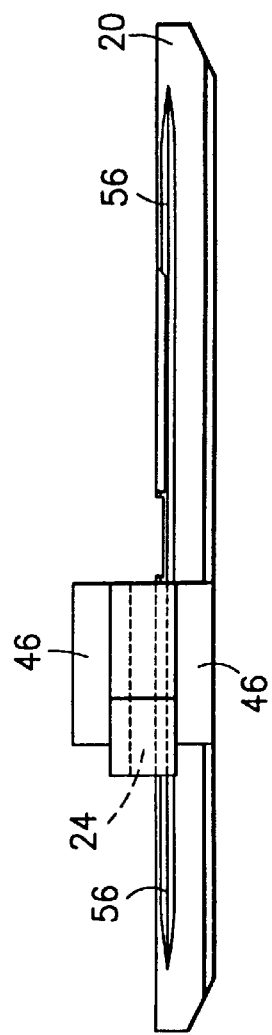
FIG. 5 is a bottom plan view of the assemblage of FIG. 4.
Figure 7:
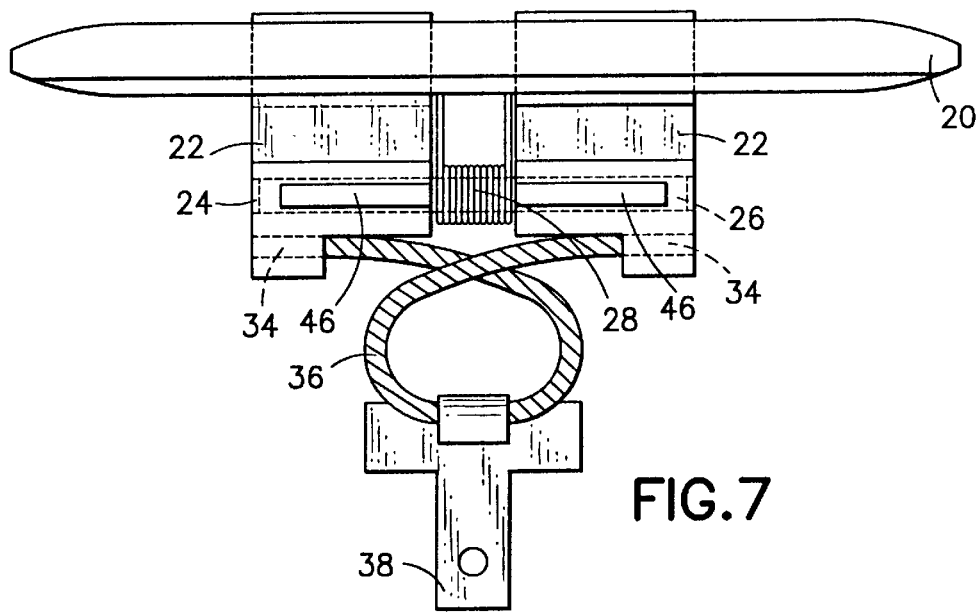
FIG. 7 is a side elevational view of two shoe assemblages connected together by a wire lead and electrical terminal, and with a biasing spring in place.
Figure 8:
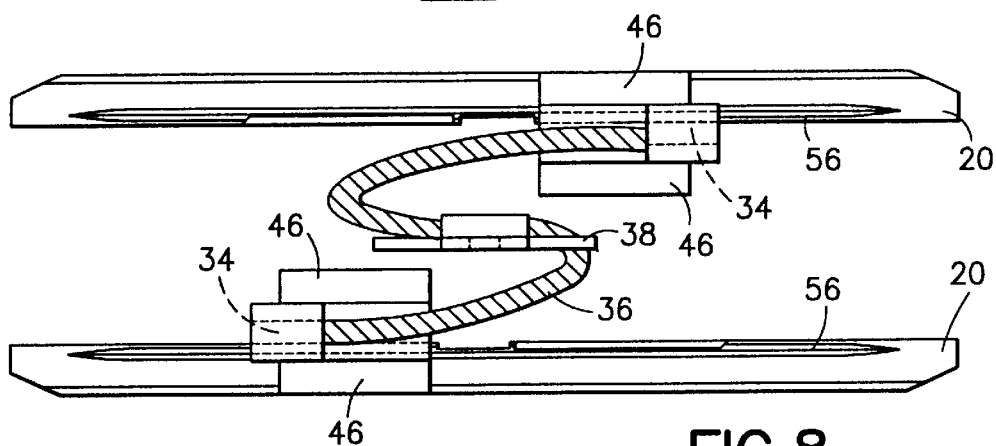
FIG. 8 is an exploded bottom plan view of the shoe assemblages of FIG. 7, separated by a small distance for clarity of illustration.
Figure 9:
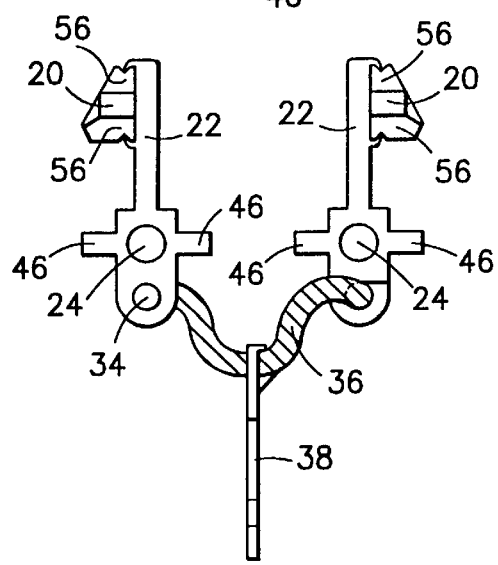
FIG. 9 is an end elevational view of the shoes and lead wire, of FIG. 8.
Figure 12:
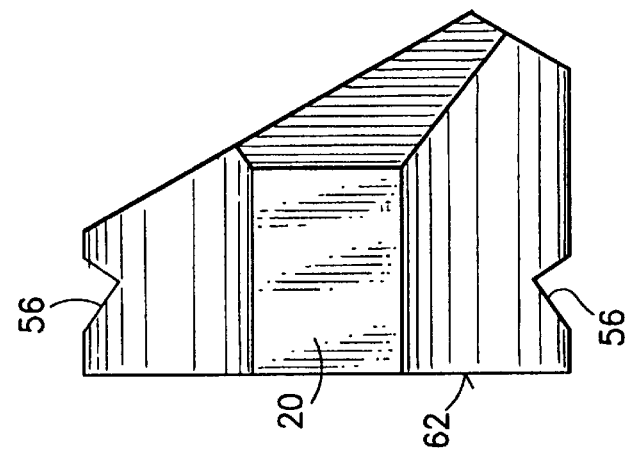
FIG. 12 is an end elevational view of the shoe of FIGS. 10 and 11, greatly enlarged.
Figure 11:
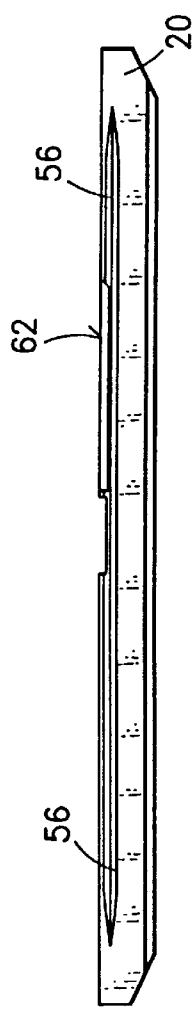
FIG. 11 is a top plan view of the shoe of FIG. 10.
Figure 10:
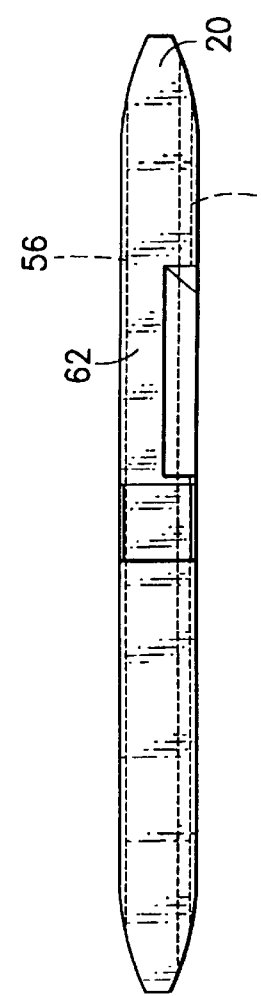
FIG. 10 is a side elevational view of one collector shoe of the duplex device.

Referring first to FIGS. 1–3, the improved duplex electrical collector of the invention comprises a pair of elongate, back-to-back metal shoes 20, which can be constituted of an alloy or mixture containing copper as an important ingredient. Beryllium copper alloy, or copper graphite have been found suitable, in forming the shoes 20.

In one embodiment of the invention, separate sturdy metal plates 22 are provided respectively for pivotally supporting the shoes and for making electrical connections thereto. The plates 22 are staggered or offset, FIGS. 1 and 4–7, and are attached to the shoes at off-center locations.

Each paired plate 22 and shoe 20 constitutes a separate identical assemblage which, when the assemblages are placed back-to-back, results in the plates 22 being offset from each other. To effect the pivotal connection, the plates 22 are provided with bores 24 in which a pivot pin 26 is placed. The pin 26 carries a torsion spring 28 whose offset ends 30 engage the shoes 20. The spring 28 biases the shoes 20 apart, that is, in directions away from each other.

The above assemblage, except for the shoes 20, is enclosed in a two-part insulating housing 32 which has retention portions that interfit with cooperable portions of the assemblage to retain the latter captive and operative in the housing.

To provide for conduction of electrical current to the shoes 20, the plates 22 have additional bores 34 in which the ends of a common heavy lead wire 36 are crimped or soldered. The center of the lead wire 36 is attached to a terminal strip 38 which projects from the housing 32 through collar halves 40 thereof.

The housing 32 comprises two identical halves each identified by the number 42, as in FIGS. 18 and 19. Each housing half 42 has a pair of internal shoulders 44 which interfit with or engage shoulders 46 of the shoe assemblages to hold the latter captive in the housing. As shown in these figures the housing halves 42 at their ends have apertured keyed matching and interlocking flanges 48 which mate to form a convenient attachment and mounting means for the collector. The halves 42 also have retention clips 50 and cooperable slots 52 to enable a snap assembly of the halves to be accomplished. Sloping shield portions 54 of the housing halves provide added safety where mounting hardware such as a screw is located.

Attachment of the plate 22 to the shoe 20, in the above embodiment, can be effected by a crimping operation where carbon graphite material is used for the shoes. Each shoe 20 has a pair of oppositely-disposed grooves 56 adapted to receive spaced-apart ribs 58 of an associated plate 22. The ribs are securely crimped against the shoe and into the opposite grooves. High electrical conductivity is effected by the provision of relatively large planar coengaging surfaces between the plate 22 and the shoe 20. As seen in FIG. 15 the plate 22 has the area designated 60 and the shoe has the area 62 which areas are maintained in intimate contact with each other.

In another embodiment of the invention where beryllium copper is used for the shoes, as illustrated in FIG. 22, the shoe 64 and the plate 66 can be cast or formed as a single integral part, since sufficient strength is had in the metal.

Figure 23:
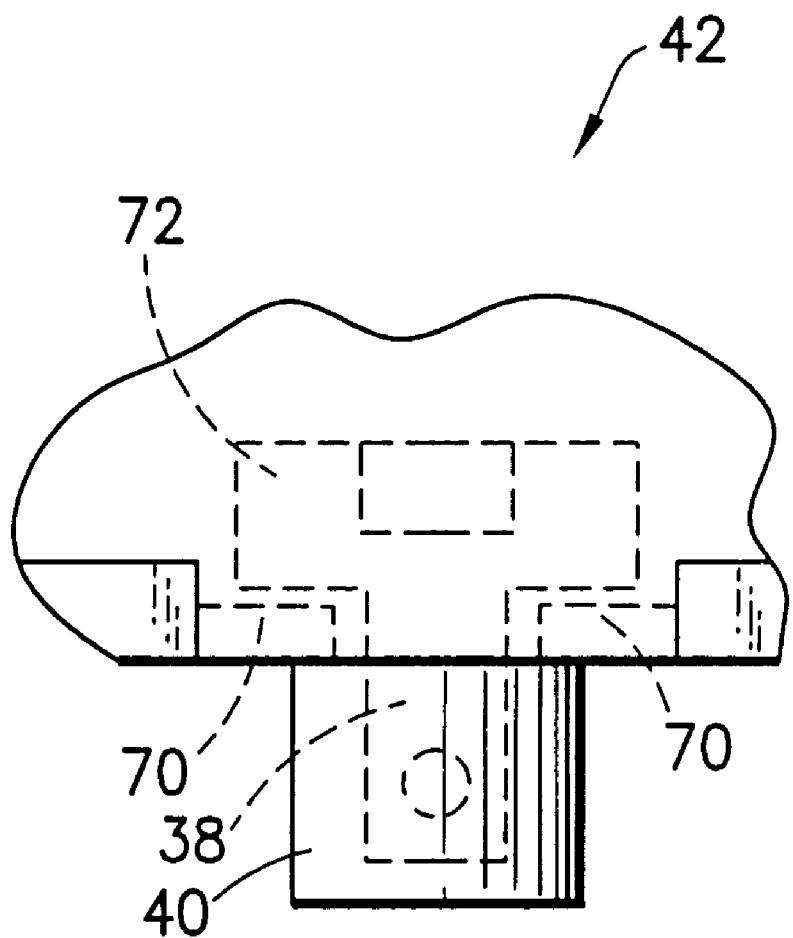
FIG. 23 is a fragmentary side elevational view of the lower portion of the duplex electrical collector of the invention, illustrating another embodiment thereof.

Still another embodiment of the invention is shown in FIG. 23. In this figure the terminal 38 is disposed inside the housing 42, and specifically partially inside the collar parts 40 thereof and partially inside the body portion of the housing. The lower walls 70 of the housing 42 positively hold captive the cross-arm portion 72 of the terminal 38, as shown. This minimizes the likelihood of the terminal being torn loose during removal of the cooperable female fitting (not shown).

It will now be seen that we have provided an improved, compact and small-dimensioned electrical collector shoe for various types of rail electrification systems, which has a high current carrying capacity for its size, yet is simple, compact and capable of low-cost manufacture.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A duplex electrical collector for a rail electrification system, comprising in combination:
   a) a pair of elongate, back-to-back metal shoes constituted of a metal alloy containing copper,
   b) means disposed laterally of said shoes and including a pair of metal plates joined to the shoes, for making electrical connections to the shoes and for pivotally connecting the shoes to each other for relative pivotal movement,
   c) resilient means for biasing said shoes in directions away from each other,
   d) an insulating housing which encloses the said electrical connection and pivotal connecting means,
   e) said housing, connection, and connecting means having interfitting retention portions which hold the connection and connecting means captive in the housing while permitting limited relative movement of said metal plates and shoes,
   f) flexible electrical lead means which electrically connect said metal plates to each other, and
   g) an electrical terminal at said housing, connected to said lead means to bring electrical current to the said back-to-back shoes.

2. A duplex electrical collector as claimed in claim 1, wherein the metal shoes and metal plates are respectively integral with each other and constituted of beryllium copper.

3. A duplex electrical collector as claimed in claim 1, wherein the metal plates and metal shoes have crimp securement means which respectively physically secure the plates to the shoes.

4. A duplex electrical collector as claimed in claim 3, wherein said crimp securement means comprise pairs of grooves and pairs of ribs disposed on said metal plates and metal shoes, said ribs being received respectively in said grooves.

5. A duplex electrical collector as claimed in claim 4, wherein the grooves are disposed in the metal shoes and the ribs are disposed on the metal plates.

6. A duplex electrical collector as claimed in claim 1, wherein the means for pivotally connecting the shoes includes a pivotal connection between the said metal plates.

7. A duplex electrical collector as claimed in claim 1, wherein the resilient means comprises a torsion spring engaged with the said shoes.

8. A duplex electrical collector as claimed in claim 7, wherein the means for pivotally connecting the shoes comprises a pivot pin, said torsion spring being carried by the said pin.

9. A duplex electrical collector as claimed in claim 1, wherein the insulating housing comprises two parts which cooperate to enclose the electrical connection and pivotal connecting means.

10. A duplex electrical collector as claimed in claim 9, wherein the housing parts are identical to each other.

11. A duplex electrical collector as claimed in claim 1, wherein the interfitting retention portions comprise interference shoulders on the housing, connection, and connecting means.

12. A duplex electrical collector as claimed in claim 11, wherein the metal plates have pairs of said shoulders and the housing has cooperable pairs of said shoulders, respectively engageable with the pairs of shoulders of the metal plates.

13. A duplex electrical collector as claimed in claim 1, wherein the metal plates have bores and the said lead means comprise wires inserted in said bores and crimped therein.

14. A duplex electrical collector as claimed in claim 1, wherein the electrical terminal comprises a metal blade having a formed arm which is crimped over the said lead means.

15. A duplex electrical collector as claimed in claim 1, wherein the means for pivotally connecting the shoes to each other comprises an elongate pivot pin, said metal plates having bores through which the pivot pin passes, and said resilient biasing means comprises a torsion spring which is carried by the said pivot pin.

16. An electrical collector shoe assemblage for a rail electrification system, comprising in combination:
   a) an elongate metal shoe constituted of metal containing copper,
   b) said shoe having intermediate its ends an elongate, wide-extending contact surface,
   c) pivotal mounting and current-feeder means for said shoe, comprising a metal plate having a contact surface in intimate physical engagement with the contact surface of said shoe,.
   d) said pivotal mounting and current-feeder means comprising a pair of opposed crimp securement means on said shoe and metal plate, for physically attaching the shoe and plate together and for maintaining said contact surfaces in said intimate physical engagement with each other,
   e) said physically-engaged contact surface of the metal plate being fully planar and said pair of crimp securement means of the plate being disposed at opposite edges of said planar contact surface.

17. An electrical collector assemblage as claimed in claim 16, wherein the metal shoe is constituted of copper graphite.

18. An electrical collector assemblage as claimed in claim 16, wherein said crimp securement means comprises a pair of grooves in the shoe and a pair of ribs disposed on said metal plate and received in the said grooves.

19. An electrical collector assemblage as claimed in claim 18, wherein the ribs on the metal plate are disposed on opposite sides of the contact surface of the plate.

20. An electrical collector assemblage as claimed in claim 16, wherein said metal plate has an elongate bore to receive a pivot pin for mounting of the plate.

21. An electrical collector assemblage as claimed in claim 16, wherein said crimp securement means comprises a pair of ribs disposed on said metal plate, one of said ribs being disposed at an edge of the plate.

22. An electrical collector assemblage as claimed in claim 20, wherein said metal plate has a bore to receive a conductor wire, said bore being juxtaposed and substantially parallel to the elongate bore for the pivot pin.

23. An electrical collector shoe assemblage for a rail electrification system, comprising in combination:
   a) an elongate metal shoe constituted of a metal alloy containing copper,
   b) said shoe having intermediate its ends an integral mounting and current-feeder means comprising a metal plate extending laterally from the shoe,
   c) said plate having a first bore extending substantially parallel to the shoe,
   d) a pivot pin in said first bore,
   e) a torsion spring disposed on the pivot pin, said spring having one of its ends engaged with the shoe to impart a bias thereto,
   f) said plate having a second bore disposed adjacent the first bore, and
   g) a flexible lead disposed in said second bore,
   h) said plate being crimped on said flexible lead.

24. An electrical collector shoe assemblage for a rail electrification system as claimed in claim 23, and further including an elongate stop shoulder projecting from said plate at the location of said first bore, said stop shoulder extending generally parallel to said shoe.

25. An electrical collector shoe assemblage for a rail electrification system as claimed in claim 23, and further including a pair of elongate stop shoulders projecting in opposite directions from said plate at the location of said first bore, said stop shoulders extending generally parallel to said shoe at the location of said first bore, said stop shoulders extending generally parallel to said shoe.

26. A duplex electrical collector as claimed in claim 1, wherein the electrical terminal is disposed at the exterior of the housing.

27. A duplex electrical collector as claimed in claim 1, wherein the insulating housing has a collar with depending collar halves, and said electrical terminal is disposed between said collar halves.

28. A duplex electrical collector as claimed in claim 1, wherein said electrical terminal is disposed substantially within said housing.

* * * * *